Aug. 30, 1966 E. C. SMITH 3,270,278
HIGH FREQUENCY A.C. BRIDGE WITH LOW FREQUENCY MODULATION
Filed Aug. 20, 1962 2 Sheets-Sheet 1
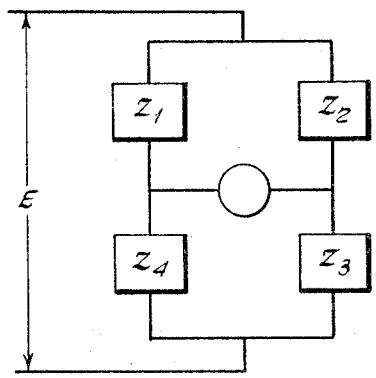
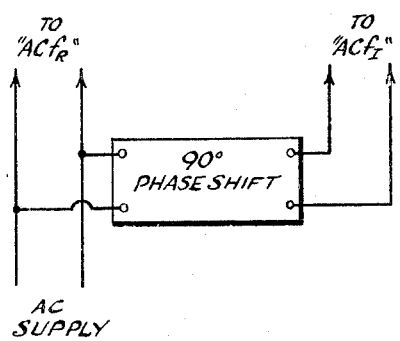
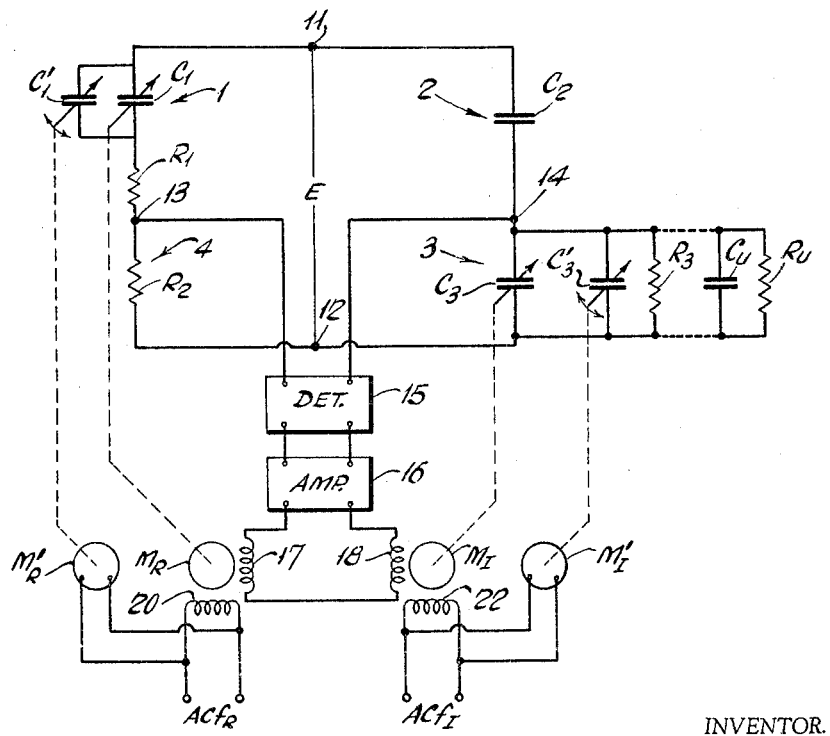
INVENTOR.
EDWARD C. SMITH
BY
ATTORNEYS Aug. 30, 1966    E. C. SMITH    3,270,278
HIGH FREQUENCY A.C. BRIDGE WITH LOW FREQUENCY MODULATION
Filed Aug. 20, 1962    2 Sheets-Sheet 2

INVENTOR.
EDWARD C. SMITH
BY [signature]
ATTORNEYS

United States Patent Office 3,270,278
Patented August 30, 1966

3,270,278
HIGH FREQUENCY A.C. BRIDGE WITH LOW
FREQUENCY MODULATION
Edward Clayton Smith, Ramsey, N.J., assignor to The
United States Rubber Company, Wayne, N.J., a corporation of New Jersey
Filed Aug. 20, 1962, Ser. No. 217,841
3 Claims. (Cl. 324—57)

This invention relates to an automatic bridge balancing system and more particularly relates to a system for balancing a relatively high frequency A.C. bridge by the continuous and simultaneous adjustment of two bridge parameters.

The invention is particularly applicable to bridge circuits which carry alternating current of relatively high frequency, i.e. 5,000–10,000 cycles per second and higher, and which contain complex impedances, resulting in the occurrence of complex voltages and currents in the circuit.

Automatically balanced D.C. bridges are applied in electronic recorders, computers, converters, servo-mechanisms and other systems. These systems are concerned with one scalar variable such as temperature, position, velocity, humidity, direct voltage, direct current, and the like. Automatically balanced A.C. bridges which are concerned with vector quantities, variables, or unknowns are restricted to relatively low frequencies below 500 cps. Direct current bridge circuits with purely resistive circuit elements, and alternating current bridge circuits in which balancing requires the adjustment of only one scalar variable, are readily adaptable to automatic self-balancing by well-known and relatively simple methods. Alternating current bridges with complex impedances, however, in general require the adjustment of two circuit elements or controls for balancing. A simple null-point indicator can show only the extent of unbalance such a bridge, and does not indicate separately either the magnitude or the direction of the adjustments of the two controls that are needed to balance the bridge. In balancing such a bridge manually, first one control is adjusted to the point of minimum output as shown by the null-point indicator, by oscillating the control through the minimum position; the second control is then similarly adjusted; and this process is repeated until balance is achieved. Substantial difficulty has heretofore existed in devising automatic means for carrying out this manipulation. Heretofore, no satisfactory method for automatically adjusting high frequency bridge circuits has been known, and the lack of it has prevented the use of A.C. bridges in many applications where automatic balancing is required.

It has been known to provide automatically balanced complex alternating current bridges wherein phase-responsive motive means, actuated by the unbalance output of the bridge are used to adjust circuit elements of the bridge in such direction and to such extent as to balance the bridge. However, the phase-responsive motive means operate on current of the same frequency as the bridge supply current, and its relatively limited range of frequency response restricts the upper limit of frequency and/or the range of frequencies at which the bridge can operate.

Therefore, an object of this invention is to provide a system for adjusting a complex alternating current bridge with practically no upper limit on the frequency range employed, which can be from about 5 kilocycles to 1,000 megacycles or even higher.

A further object is to provide a system for continuously and automatically balancing the real and imaginary components of a complex bridge circuit operable at relatively high frequency and thereby having no frequency restriction.

Still another object of this invention is to automatically balance a complex bridge operable at high frequencies by modulating, at low frequency, signals which appear across one or more selected circuit elements in selected bridge arms and using the resulting lower frequency modulation signals in the bridge output to determine and/or effect bridge balance.

Yet another object of this invention is to automatically balance a complex bridge operable at high frequency by modulating one or more selected circuit elements in one or more arms at one or two lower frequencies, and using the resulting lower frequency modulation signals in the bridge output to balance the bridge.

Still another object of this invention is to provide a system for automatically adjusting a variable circuit element in an electrical circuit comprising complex impedances and carrying alternating current of high frequency to give an optimum (i.e., maximum or minimum) output voltage of the circuit.

Another object of this invention is to provide a system for automatically balancing a complex A.C. bridge with no frequency restriction.

Briefly, according to the broad principles of my invention, I employ a complex bridge circuit having a high frequency applied thereto, in which circuit a low frequency modulating signal is applied to a selected circuit element in one of the arms. As a result, low frequency modulation of predetermined frequency and phase is imposed upon the complex high frequency current flowing in that arm of the bridge circuit. The resulting modulated signal appearing in the output of the circuit, which is taken across the null terminals, is demodulated and filtered to separate the modulation component. If the bridge is not balanced, the output modulation component is of the frequency of the original modulating signal, and is either in phase or 180° out of phase with it, according to the sense of the deviation of the circuit from the desired state (as will be explained later). The output modulation component and the modulating signal are compared, and the resulting signal is used to adjust compensating bridge elements (the control) to achieve balance. Two such modulating signals, differing in frequency or in phase, applied respectively to two properly selected circuit elements, provide for the simultaneous and independent adjustment of two balance controls, of which one effects resistive balance, the other, reactive balance.

In an aspect of this invention, the output modulation component and a voltage source which is 90° out of phase with the original modulation are connected to a phase-responsive motive means, which operates to adjust a circuit element (the control) in one of the arms in the sense required to bring the circuit to balance. If the circuit is in the desired state, there is no modulation component having the frequency of the original modulation, and no adjustment of the control is made.

The above-mentioned and other features and objects of this invention and the manner of attaining them will become more apparent and the invention itself will be best understood by reference to the following description of embodiments of this invention taken in conjunction with the accompanying drawings, wherein:

FIGURE 1 is a generalized block diagram of a bridge circuit;

FIGURE 2 is a circuit diagram of my invention;

FIGURE 2a is a modified embodiment of the invention of FIGURE 2;

Figure 3:
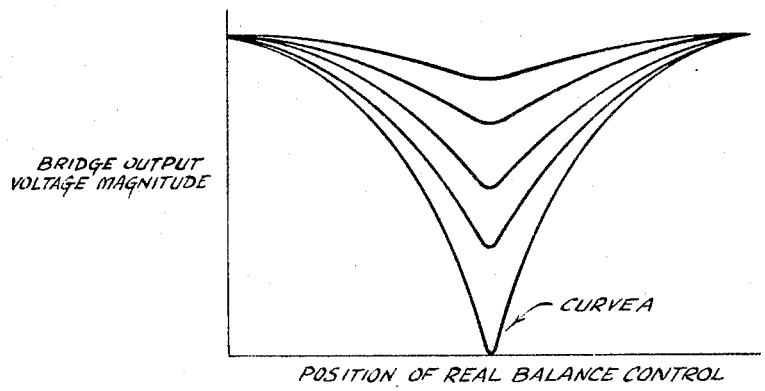
FIGURES 3–5 are various output voltage plots which show conditions over the range of operation.

Referring to FIGURE 1, there is shown a generalized bridge circuit in which complex impedances $Z_1$, $Z_2$, $Z_3$, $Z_4$ constitute the respective arms 1, 2, 3, 4. At balance, basic bridge theory requires $$Z_1 \times Z_3 = Z_2 \times Z_4 \qquad (1)$$

FIGURE 2 illustrates a preferred embodiment of my invention in which a Schering bridge circuit proper comprises variable condensers $C_1$ and $C_3$ (the controls) in parallel with modulator condensers $C'_1$ and $C'_3$ respectively; fixed resistors $R_1$, $R_2$ and $R_3$; and fixed condenser $C_2$. The subscript indicates the arm of the bridge in which the circuit parameter is located. The bridge is supplied at terminals 11 and 12 with alternating voltage E of relatively high frequency. The bridge output taken at null terminals 13 and 14 is fed to a detector 15 which includes a filter to pass the low-frequency modulation components of the bridge output therethrough. These components are applied through amplifier 16 to coils 17 and 18 of the phase-responsive motors $M_R$ and $M_I$ respectively, which operate control condensers $C_1$ and $C_3$ respectively.

The second coil 20 of motor $M_R$ is supplied with alternating current of frequency $f_R$, and the second coil 22 of motor $M_I$ is supplied with alternating current of frequency $f_I$, where $f_R$ and $f_I$ are any two different low frequencies (i.e., up to about 2,000 cycles per second) which are not in a 2:1 ratio. Synchronous motor $M'_R$ is supplied with current of frequency $f_R$, from a voltage source (not shown) and is adapted to drive modulator condenser $C'_1$ so as to modulate the current flowing in bridge arms 1 and 4 at a frequency $f_R$, 90° out of phase with the voltage source. As will be explained below, this modulation produces a modulation component of frequency $f_R$ in the output in the unbalance condition which will energize motor $M_R$ to adjust control condenser $C_1$ in the proper sense to balance the bridge; it will not actuate $M_I$ which requires frequency $f_I$. Similarly, synchronous motor $M'_I$, modulator condenser $C'_3$, and motor $M_I$, operating at frequency $f_I$, effect adjustment of condenser $C_3$ to the balance point without affecting the adjustment of condenser $C_1$.

The two-phase motive means used in the FIGURE 2 embodiment of the invention comprises a two-phase motor ($M_R$ or $M_I$) comprising two stator windings spaced 90° from each other. The voltages fed to the two stator windings are 90° out of phase. This 90° phase difference plus the effect of the 90° mechanical spacing of the windings results in a rotating magnetic field. The rotating magnetic field induces a voltage in the rotor of the motor by transformer action, and hence, the rotor is turned by the interaction of the magnetic fields present and does not turn unless two input signals of the same frequency and 90° phase difference are applied. The direction of rotation is determined by the sign of the phase difference. The rotor speed is determined by the amplitude of the voltages applied to the two windings. Such two phase motors cannot practically be operated or designed for high frequencies above 2,000 c.p.s. (illustrative of the order of such frequencies).

The necessary and sufficient conditions for balance in the bridge of FIGURE 2 may be found by application of Equation 1. The results are:

For resistive balance, $R_3 = (R_2/C_2) \times (C_1 + C'_1)$ (2)

For reactive balance, $R_1 = (R_2/C_2) \times (C_3 + C'_3)$ (3)

The choice of $C_1$ and $C_3$ as controls is exceptionally desirable since when the bridge is near balance, changes in $C_1$ will have only a minor effect on the reactive balance, and changes in $C_3$ will have only a minor effect on the resistive balance. Resistor $R_3$ could equally well be used in place of $C_1$ as the control element and/or the modulator for resistive balance, and similarly, resistor $R_1$ could equally well be used in place of $C_3$.

The bridge of FIGURE 2 can be used in well-known fashion to measure the resistive and reactive components of an unknown impedance. The bridge is first balanced without the unknown; the unknown (represented in FIGURE 2 by $C_u$ and $R_u$ in parallel) is connected in parallel in arm 3 (as indicated in FIGURE 2) and the bridge is re-balanced. The changes in controls $C_1$ and $C_3$ are respectively measures of the resistive and reactive components of the unknown.

The circuit of FIGURE 2 may be adapted to use a single A.C. source in place of two sources of different frequency; nevertheless, two distinct modulating signals are required. This is achieved by a phase difference of 90° between the A.C. supply to motors $M_R$, $M'_R$ on the one hand and to motors $M_I$, $M'_I$ on the other hand.

FIGURE 2a illustrates one means for accomplishing this, wherein an A.C. supply is connected directly to terminals "AC$f_R$" and through a 90° phase shifter to terminals "AC$f_I$" of FIGURE 2. Modulator $C'_1$ acts in the manner previously described to give in the output of amplifier 16, a modulation component which is 90° or 270° out of phase with the A.C. supply and in phase or 180° out of phase with the corresponding modulating signal; this component actuates $M_R$ (the winding 20 of which is supplied directly with the A.C. supply), but does not actuate $M_I$ (the winding 22 of which is supplied with current 90° out of phase with the A.C. supply). Similarly, modulator $C'_3$ gives in the output of amplifier 16 a modulation component which is in phase or 180° out of phase with the A.C. supply, and 90° or 270° out of phase with the corresponding modulating signal; this component actuates $M_I$, but does not actuate $M_R$.

While automatic balancing of both controls, as in FIGURE 2, is usually preferable, it is obviously possible to balance one automatically and the other by manual adjustment, if for any reason this is desired.

*Operation*

Figure 4:
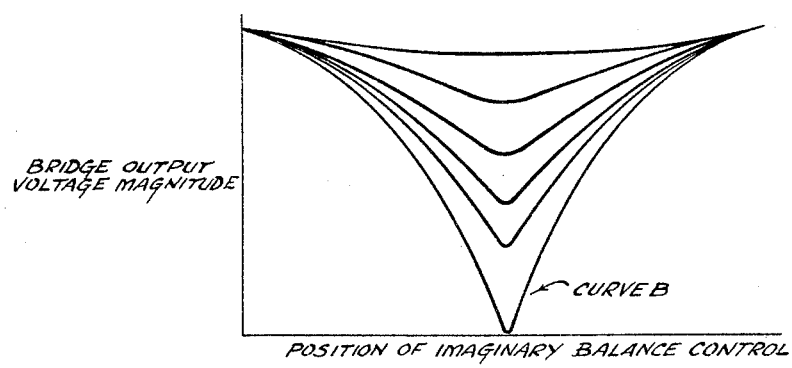
Figure 5:
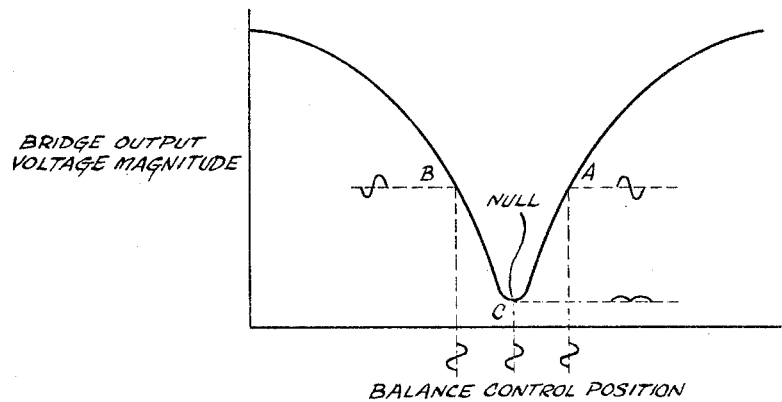

The operation of this invention may be understood by reference to FIGURES 3–5.

In an A.C. bridge which is employed to determine the real and imaginary, capacitive and resistive, inductive and resistive, capacitive and power factor, capacitive and storage factor, or other complex descriptive means for an unknown, two balance controls are necessary, the conditions for balance in the bridge of FIGURE 2 being given in Equations 2 and 3. If the real balance control ($C_1$) is varied through its range while the imaginary balance control ($C_3$) is stationary, a family of curves illustrated in FIGURE 3 will be obtained for the magnitude of the bridge output voltage. Curve A is obtained when the imaginary balance control is located at its balance position. A similar family of curves, shown in FIGURE 4, will be obtained when the imaginary balance control is varied through its range with a stationary real balance control. Curve B is obtained for a balanced value of the real balance control.

Due to the symmetry and similarity of the bridge output voltage curves, insufficient information is available to provide an automatic control. The required information is supplied by the modification of the bridge circuit according to the present invention, as explained in the following paragraphs.

If a periodic modulating signal is applied to a balance control, the modulation component of the output voltage will be in phase with the modulating signal on one side of null, will be 180° out of phase with the modulating signal on the other side of null (as indicated at points A and B respectively of FIGURE 5), and will consist entirely of a second harmonic at null (as indicated at point C). If the minimum in the output voltage-control position curve is rounded as shown in FIGURE 5 (and as is almost invariably the case in practice), the modulation voltage is smaller at control position points close to the desired null value than at points further away. This is because, with a given modulator amplitude, the modulation voltage is proportional to the slope of the curve. As a result, the voltage to actuate the phase-responsive motive means decreases as the desired control position is approached, which is advantageous in that it helps to avoid excessive correction rate and "over-shooting" of the control.

Thus the modulation component of the null voltage provides means for balancing the corresponding control by indicating the direction and degree of unbalance, and actuating the balancing means. Two balance controls may be independently operated by employing two different modulating frequencies (but not in a 2:1 ratio), or by employing modulating means which are 90° out of phase at the same frequency. The circuits of FIGURES 2 and 2a are examples.

It is obvious that the modulating means may be the control element itself, sometimes more conveniently a smaller element having the same impedance characteristics as the control element and connected in series or in parallel with the latter, as may be appropriate in any particular case. In general, the modulating means may also be any other circuit element whose variation has an effect on the circuit output voltage analogous to the effect of variation of the control element.

While the foregoing description sets forth the principles of the invention in connection with specific apparatus, it is to be understood that this description is made only by way of example and not as a limitation of the scope of the invention as set forth in the objects thereof and in the accompanying claims. In particularly, there are many A.C. bridge circuits to which the invention is applicable. Such circuits may include elements having resistive, capacitive, or inductive impedance, and elements having complex impedance.

It is also to be understood that the particular phase-sensitive motive means for adjusting the controls, and the particular means for producing the modulation, are not unique or critical features of the invention. Thus, an electronic or electro-mechanical phase detector in conjunction with a reversible D.C. or A.C. motor may be adapted for adjusting the controls; and electronic means for modulation may be used instead of the mechanical means shown in the examples.

I claim:

1. An apparatus for balancing a complex bridge which operates at a relatively high frequency comprising
   means for supplying a relatively high frequency signal,
   means for supplying first and second relatively low frequency modulating signals,
   means for modulating said high frequency signal in said bridge in response to said low frequency modulating signals,
   means for detecting the low frequency modulation components of said high frequency signal at the output terminals of said bridge,
   and means for adjusting the value of first and second parameters of said bridge in response to said detected modulation signal components to produce real and imaginary balance of the bridge, including phase-responsive means for developing signals representative of the relative phases of said modulating signals and said detected modulation signal components.

2. An apparatus for balancing a complex bridge which operates at a relatively high frequency having an element of unknown impedance included in one arm comprising
   means for supplying a relatively high frequency signal to said bridge,
   means for supplying first and second relatively low frequency modulating signals,
   means responsive to said low frequency modulating signals for adjusting the values of first and second circuit elements of said bridge for low frequency modulating said high frequency signal in said bridge,
   means for detecting output modulation signal components of said high frequency signal at the null terminals of said bridge,
   means for comparing the phases of said modulating signals and said detected modulation signal components to produce comparison signals,
   and means for adjusting the values of other circuit elements of said bridge in response to said comparison signals to produce real and imaginary balance of the bridge, whereby the value of said unknown impedance may be determined.

3. An apparatus for automatically balancing a complex A.C. bridge which operates at a relatively high frequency comprising
   means for supplying a relatively high frequency signal to said bridge,
   means for supplying first and second low frequency modulating signals,
   means for modulating said high frequency signal in said bridge in response to said first and second low frequency modulating signals,
   means for comparing the respective phases of the low frequency output components of said bridge corresponding to said first and second low frequency modulating signals with said low frequency modulating signals and producing first and second comparison signals,
   and means for adjusting the value of a first parameter of said bridge in response to said first comparison signal to obtain balance of the real component of the null voltage,
   and means for adjusting the value of a second parameter of said bridge in response to said second comparison signal to obtain balance of the imaginary component of null voltage.

References Cited by the Examiner

UNITED STATES PATENTS

| | | | |
|---|---|---|---|
| 2,088,059 | 7/1937 | Schulze-Herringen | 332—47 |
| 2,155,509 | 4/1939 | Schrater | 332—47 |
| 2,440,200 | 4/1948 | Jofeh | 324—99 X |
| 2,639,411 | 5/1953 | Schafer | 324—57 X |
| 2,962,641 | 11/1960 | Maltby et al. | 324—99 X |
| 2,976,727 | 3/1961 | Prigozy | 324—57 X |
| 3,028,547 | 4/1962 | Cornell et al. | 324—60 X |
| 3,115,603 | 12/1963 | Fluegel | 324—57 X |

OTHER REFERENCES

"Phase, What Does It Really Mean?" Article in Wireless World, May 1948, pages 187–190.

WALTER L. CARLSON, *Primary Examiner.*

FREDERICK M. STRADER, *Examiner.*

A. E. RICHMOND, W. H. BUCKLER,
*Assistant Examiners.*